United States Patent Office 3,272,715
Patented Sept. 13, 1966

3,272,715
METHOD FOR PRODUCING AND RECOVERING
6-AMINOPENICILLANIC ACID
Norman H. Grant, Wynnewood, and Harvey E. Alburn, West Chester, Pa., assignors to American Home Products Corporation, New York, N.Y., a corporation of Delaware
No Drawing. Filed July 17, 1962, Ser. No. 210,575
5 Claims. (Cl. 195—36)

This invention relates generally to a process for the preparation of 6-aminopenicillanic acid and more particularly to a novel method for the formation, isolation and crystallization of 6-aminopenicillanic acid.

The utility of the compound 6-aminopenicillanic acid as a valuable intermediate for furnishing the penicillin nucleus in the synthesis of penicillin derivatives having desirable antibiotic activity is well known and several methods for preparing said compound have already beeen proposed. For example, a process has been suggested for the preparation of 6-aminopenicillanic acid or its salts wherein a penicillin-producing mold such as *Penicillium chrysogenum* is grown in a nutrient medium and the 6-aminopenicillanic acid or a salt thereof is isolated from the fermentation liquor obtained. In accordance with said method, the isolation of the compound is obtained by a cumbersome multi-step operation comprising: first concentrating the liquor and thereafter adjusting the pH thereof to 3.0, centrifuging, extracting the butyl acetate, adjusting to pH 7.5 precipitating impurities by addition of acetone, concentrating, adjusting to pH 7.0, treating with an ion-exchange resin, eluting with HCl, adjusting to pH 6.0, concentrating again, and finally precipiating 6-aminopenicillanic acid therefrom in crystalline form by the addition of an acid, e.g., hydrochloric acid, in amount to adjust to pH 4.3. In another method proposed, organisms such as *Botrytis cinerea* and *Streptomyces* are incubated in amidase substrate specified as phenoxymethyl penicillin and n-heptylpenicillin, the soluble enzyme obtained is precipitated by ammonium sulfate or acetone and the 6-aminopenicillianic acid is obtained in crystalline form by a procedure that involves a pH 2 solvent extraction, neutralization, concentration, and acidification to pH 5. With this method, a yield of only 48% was obtained in the precipitation step. Alternatively, introduction of an ion-exchange resin, folowed by an acetic acid elution may be included between the neutralization and concentration steps. By this alternative method, there has been obtained an overall yield of only about 12%.

In accordance with the novel procedure of our invention, crystalline 6-aminopencillanic acid is isolated in high yield by a process which generally comprises incubation of a penicillin with aqueously resuspended cells of a micro-organism that produces amidase capable of cleaving the penicillin at $C_6$, centrifuging the incubated mixture; acidifying the supernatant obtained; extracting the acidified supernatant with organic solvent; bringing the aqueous phase of the extracted supernatant to the pH region of minimum solubility as referred to hereinafter, and then concentrating the resulting aqueous phase to give the final crystalline product in good yield. As will appear from the examples of the invention set forth hereinafter, the micro-organisms may be a bacterium or a fungus as long as it is capable of performing the stated cleavage function.

Advantageously, in the exercise of the process of the invention, cells of the organism of the kind defined above, after being cultured in a conventional culture medium such as corn steep liquor, are separated by centrifugation or filtration from the culture medium, resuspended at about 2.5 grams packed wet cells per gram of penicillin in an 0.01 M phosphate solution (pH 7.7) containing 1% penicillin, and shaken for about 16–18 hours at 28° C. The cells are removed, the solution is adjusted to pH 1.5–3.0, and extraction of any compounds resulting from hydrolysis of the acyl side chain of the penicillin used as starting material, e.g., any phenyl acetic acid, phenoxy acetic acid, and of any pencillin, and/or penicilloic acid present, is carried out with a solvent such as amyl acetate. The aqueous fraction is adjusted to pH 3.0–5.0, preferably 3.6–4.1, and concentrated. Concentration may be carried as far as 100-fold, but crystallization generally begins with as little as 10-fold concentration, and approximately 50-fold is a desirable concentration. The precipitate is collected, washed with a small volume of water and then with an organic solvent, preferably acetone, and is finally dried under vacuum. The product is essentially pure without recrystallization and is obtained in yields of the order of 50–60% overall and 80–90% for the isolation.

It is most important that the concentration and crystallization step of our method occur within the pH range noted above, which is found to be the range of minimum solubility. We have discovered that, if the step is performed outside said critical pH range such as at neutrality, three beta-lactam-rupturing reactions can accompany or follow concentration of the product. Such reactions undesirably lead to formation of penicic acid (hydrolyzed 6-aminopenicillanic acid monomer), 8-hydroxypencillic acid (reaction product with $CO_2$), and poly-6-aminopenicillanic acid, a polymer newly discovered by us. This unexpected phenomenon is discussed in greater detail below.

It appears that the beta-lactom of 6-aminopenicillanic acid (6–APA) is susceptible to cleavage by bases and penicillinase, giving an alpha-amino acid (penicic acid) as the product. Our examination of facile catalytic beta-lactam cleavage of 6–APA and penicillions in frozen systems showed that ring opening in 6–APA can occur in the absence of added catalyst. It was further indicated that under various conditions polymerization to low molecular weight peptides accompanies ring opening in potassium 6–APA solutions.

The reaction apparently consists in nucleophilic attack by the primary amino group on the beta-lactom of a neighboring molecule, forming polyamides of various chain lengths having the probable structure below:

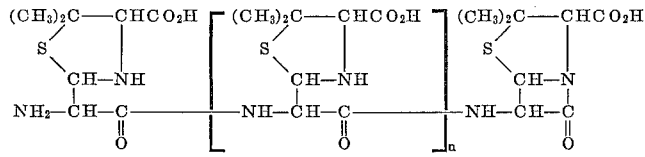

The reaction was observed in K 6–APA solutions in water (pH 6–7) or phosphate buffer, with or without imidazole, in air or nitrogen atmosphere, at temperatures between $-28°$ and $+24°$, and over periods of 18 hours to 18 days. Concentrated solutions of K 6–APA (>2 mola) formed a precipitate on standing at room temperature for about 60 hours. This precipitate was redissolvable and was chemically similar to the product remaining in solution.

Beta-lactam cleavage was revealed by loss of the 5.6–

5.7μ band in infrared spectra and loss of the capacity to react with hydroxylamine at neutral pH. Formation of monosubstituted amide linkages was revealed by appearance of 6.0μ and 6.6μ absorption bands and by loss of ninhydrin reactivity, after OH⁻ treatment, which paralleled loss of hydroxylamine reactivity. Differences between 6-APA, penicic acid, 8-hydroxypenillic acid (8-HPA) and 6-APA peptide are shown in the table below. Peptide A was formed from 5 molal K 6-APA in water at 23° for 3 days, followed by 24 hour dialysis, and freeze-drying. Peptide B was formed from 3 molal K 6-APA in water, under N₂, at 23° for 18 days, and freeze-drying.

TABLE I.—COMPARISON OF 6-APA PEPTIDES AND RELATED COMPOUNDS

|  | 6-APA | 8-HPA | Peptide A | Peptide B |
| --- | --- | --- | --- | --- |
| Hydroxamate a | 100.0 | 0.0 | 11.2 | 2.6 |
| Ninhydrin-direct b | 0.498 | 0.004 | 0.142 | 0.162 |
| Ninhydrin-after OH⁻ b | 1.076 | 0.020 | 0.148 | 0.204 |
| 6.0 and 6.6 μ bands | − | − | + | + | a Percent intact beta-lactam as 6-APA.
b Net optical density for 0.1 gm. of product in respective assay.

Paper electrophoresis of peptide B, 6-APA, and 8-HPA (pH 4.48, 13 volts/cm., 22°, 2.5 hours), followed by ninhydrin staining, showed that 6-APA did not migrate, 8-HPA did not stain, and B moved, as 3 nondiscrete spots, distances of 1–3 cm. toward the anode. Peptide A, with 88% of beta-lactam lost, had no antimicrobial activity against Staph. aureus before or after acylation with phenylacetyl chloride. $[a]_D^{1z}$ was +162.2 for A, compared with +286.9 for K 6-APA. From the residual beta-lactam, a number average molecular weight of about 1800 was calculated for the acid product, which indicated an octapeptide for this preparation.

The amount of product failing to pass through cellulose dialysis membranes varied with preparative conditions. Thus, peptide A represented 20% of the initial 6-APA. Subsequent 6 hour dialysis of A and of K 6-APA (8/32 Visking casing) showed retention of 65% of polymer and 6% of K 6-APA. Another peptide, C, formed from 0.1 M K 6-APA in the presence of 0.1 M imidazole at −18° in 18 hours, was retained to the extent of 70% after prolonged dialysis. C showed absorption maxima at 6.0 and 6.6μ, but not at the beta-lactam region near 5.7. Elemental analysis gave the following:

*Analysis.*—Calcd. for $C_8H_{11}O_3N_2SK$: C, 37.8; H, 4.3; N, 11.0. Found: C, 37.4; H, 5.1; N, 11.7.

Light scattering indicated a molecular weight of about 2500 (range 1700–3400) for the acid peptide.

In mixtures of 6-APA and penicillin G or V, the beta-lactam of 6-APA is preferentially attacked by the nucleophilic amino group. This was observed in systems at −18° for 2 weeks or at 23° for 3 days. Paper chromatography showed no new antibiotic formed, and amylacetate extracts of acidified solutions appeared to contain only the initial penicillin. This finding is surprising, inasmuch as penicillin G and V beta-lactams are more susceptible than that of 6-APA to base and penicillinase attack.

The method of the invention presents an inexpensive isolation process providing much higher yields of the desired 6-APA than is possible with processes using incubated ion-exchange and salt-forming sequences or acidification, neutralization, concentration and final acidification.

The following examples are illustrative of the invention and are not intended to be construed as limitative thereof.

*Example 1*

(a) Twelve liters of a culture broth of *Alcaligenes faecalis* in corn steep liquor was centrifuged through a cooled Sharples centrifuge. The packed cells weighed 88.5 g. and contained 27.6% solids. Sixty-two grams were suspended evenly by stirring in 0.1 M $$K_2HPO_4—KH_2PO_4$$

pH 7.7. To this suspension were added 25 g. of potassium penicillin G in water, giving a final volume of 2.5 l. and phosphate concentration of 0.01 M. This was distributed into 5 2.5 l. Fernback flasks and shaken on a rotary shaker for 17 hours at 28°. The reaction mixture was centrifuged through the Sharples, and the supernatant was filtered with 2% Super Cel. The final volume was 2.25 l., and the pH was 7.0. The 6-APA content of the solution was 4300 mcg./ml. by bio-assay and 4900 mcg./ml. by hydroxamate assay. Since 100% conversion would give 5790 mc./ml., these represented, respectively, 74% and 85% conversion.

(b) One liter of the resulting solution was acidified to pH 2.5 with 5.4 ml. of concentrated HCl and extracted twice with 500 ml. volumes of iso-amyl acetate. The aqueous portion was brought to pH 4.0 with 6.2 ml. of 5 N NaOH and concentrated to 24.5 ml., during which crystallization occurred. The precipitate was filtered, washed with 8 ml. of cold water, then with acetone, and dried in vacuo, giving 3.48 g. of product. This product melted at 198–201° d, exactly the same as a recrystalized reference preparation. It was 89% 6-APA by bio-assay and 99.5% 6-APA by hydroxamate assay. Bio-assays showed the precipitation step yield to be 72%, and overall yield to be 53%. Hydroxamate assays showed the precipitation step yield to be 71% and the overall yield to be 60%.

*Example 2*

(a) One liter of the solution prepared as in Example 1 (a) was concentrated to 45 ml. and designated as fraction I–721–261A. Ninety ml. of cold iso-amyl acetate were added to 44 ml., and the system was acidified to pH 2.0 at 1–3° with vigorous stirring by addition of 3.5 ml. of concentrated HCl. At pH 2.0, another 75 ml. of iso-amyl acetate was added and stirring continued. The precipitate, which began to form early in the acidification, seemed to remain largely insoluble in both phases. It was removed by filtration, washed with cold water and acetone, and dried in vacuo, giving 2.71 g. of product designated as fraction I–721–261B. The water wash, designated fraction I–721–261D, contained 21 ml. Twenty-five ml. of the 26 ml. aqueous filtrate designated I–721–261C was adjusted to pH 4.0 by the addition of 1.0 ml. of 5 N NaOH. The solution became cloudy, and after 16 hours in the refrigerator it contained a heavy floc of crystals. These were filtered, washed with cold water and acetone, and dried in vacuo, giving 0.24 g. of product designated I–721–261E. The combined filtrate and water wash contained 29 ml. designated fraction I–721–261F. Analyses of the six designated fractions gave the results set forth in Table II below.

TABLE II

| Fraction | Percent Recovery of 6-APA | | Percent Product Purity | |
| --- | --- | --- | --- | --- |
|  | Bio-assay | Hydroxamate | Bio-assay | Hydroxamate |
| I-721-261A |  | 96 | 91 | 89 |
| I-721-261B | 61 | 52 |  |  |
| I-721-261C | 12 | 12 |  |  |
| I-721-261D | 5 | 5 |  |  |
| I-721-261E | 5 | 5 | 83 | 94 |
| I-721-261F | 6 | 7 |  |  |

*Example 3*

Cells from 10 liters of a broth culture of *E. coli* were separated by centrifugation, and the packed wet mass, weighing 160 grams, was resuspended in 4 liters of 0.1 M potassium phosphate buffer, pH 7.7, containing 60 grams of potassium penicillin G. The suspension was divided into five 2.5 liter Fernbach flasks and shaken on a reciprocating shaker for 16 hours at 28° C. After centrifugation, the supernatant solution, comprised 3.98 liters at pH 6.9 and contained by assay 1.83 grams of penicillin G and 23.4 grams of 6–APA, representing a 67% conversion. This solution was adjusted to pH 2.2 with 130 ml. of 6 N HCl and extracted with an equal volume of n-amylacetate. The aqueous phase was then adjusted to pH 3.8 with 32 ml. of 10 N NaOH and divided into 2 parts each consisting of 2.1 liters. One was concentrated at pH 3.8 to 83 ml. and the other was adjusted to pH 7.1 with 20 ml. of 10 N NaOH and then concentrated to 83 ml. After sitting at 22° for 65 hours, each system was filtered. Assays for 6–APA showed none in the pH 7.1 precipitate, 740 mg. in the pH 7.1 filtrate, 5.2 grams (44% of the conversion mixture content), in the pH 3.8 precipitate, and 187 mg. in the pH 3.8 filtrate. Acidification of the pH 7.1 filtrate to pH 4.1 gave 470 mg. of 6–APA (4% of the conversion mixture content). The pH 7.1 filtrate and precipitate both contained poly-6-aminopenicillanic acid and the pH 7.1 filtrate contained, in addition, penicic acid and 8-hydroxypenillic acid.

Example 4

Anion exchange resin Amberlite IR–4B was washed with 1 N NaOH and water. It was adjusted to pH 7.5 with acetic acid, and again washed with water. Solid potassium penicillin G was added with stirring to a water suspension of the resin until the maximum was adsorbed, as shown by a hydroxamate-positive supernatant fluid. The resin was then air dried. Ten grams were added to 500 ml. of a suspension containing 12.5 g. of packed *Alcaligenes faecalis* cells in 1% potassium penicillin G. After shaking for 19 hours at 28° the centrifuged system contained 455 ml. of 4000 mcg. 6–APA per ml. (hydroxamate) of 3400 mcg. 6–APA per ml. (bio-assay). Addition of 0.75 ml. of concentrated HCl to 432 ml. brought the pH to 3.8. The solution was extracted twice with one volume of amyl acetate, after which the pH measured 4.1. The solution was evaporated nearly to dryness under vacuum. A water slurry was filtered, and the precipitate washed with 5 ml. water, then with acetone, and dried over $P_2O_5$ under vacuum. The product weighed 1.15 g., was pure by the beta-lactam determination, and represented an overall yield of 39%.

Example 5

Six liters of a growing *Alcaligenes faecalis* culture were centrifuged, giving 35.8 g. of packed cells. These were resuspended to a volume of 1460 ml. with 0.01 M potassium phosphate buffer, pH 7.7, containing 14.3 g. of potassium penicillin G. The mixture was divided into three 3-liter Fernbach flasks, covered with cheesecloth and shaken on a rotary shaker at 28° C. for 18.5 hours. The final volume was 1360 ml., and the final pH was 7.2. The conversion to 6–APA was 66%. Seven ml. of concentrated HCl were added to the reaction mixture supernatant (1315 ml.) to bring the pH to 2.5. The system was extracted 3 times with 800 ml. of amyl acetate, and the aqueous fraction was adjusted to pH 3.8 with 8 ml. of 5 N NaOH. This solution (1300 ml.), containing 3.88 g. 6–APA per liter, was concentrated to about 28 ml., during which precipitation occurred. The precipitate was filtered, washed with 7 ml. of water, finally with acetone, and dried in vacuo. It weighed 4.48 g., assayed 100% 6–APA by hydroxamate and 94% 6–APA by bio-assay and represented a precipitation step yield of 89% and an overall yield of 54%.

Example 6

Four lots of packed *Alcaligenes faecalis* cells, all cultured in corn steep liquor, were suspended in 0.01 M $KH_2PO_4$—$K_2HPO_4$, pH 7.7, containing 1% K penicillin G, shaken for 17.5 hours at 28° C. These mixtures were then combined, giving 2253 ml., centrifuged, and filtered through 40 g. of Super Cel, giving 1850 ml. of filtrate of pH 7.3. This was acidified to pH 2.5 with 7 ml. of concentrated HCl and then extracted 3 times with more than one liter of amyl acetate. The pH was raised to 3.6 with 4 ml. of 5 N NaOH, and the solution was concentrated under vacuum at least than 20° C. to about 40 ml. After standing at 0° for 30 minutes the precipitate was collected on a funnel, washed with 5 ml. of cold water, then with acetone, and dried under vacuum. The product weighed 1.88 g. and was 93% 6–APA by hydroxamate assay and 89% 6–APA by bio-assay.

Example 7

The mycelial mat of a *Fusarium equiseti* contained in 500 cc. of a broth culture was removed by filtration and resuspended to its original volume in 0.04 M K-phosphate, pH 7.5, containing 1% K-penicillin V. The system was shaken on a rotary shaker at 28° for 17 hours, and the micelial mat was removed. Following this initial essential priming, the same amidase-containing mat was employed in the same manner four times producing these conversions to 6–APA: 77%, 75%, 74%, and 84%. A sixth incubation was carried out using 2% K-penicillin V, resulting in 68% conversion to 6–APA. The filtrate from this conversion (175 ml.) was acidified at 1° with 3.2 ml. of 6 N HCl to pH 2.5 in the presence of 90 ml. of n-amylacetate. The pH was adjusted to 4.1 with 1.8 ml. of 5 M KOH, and the solution was concentrated 10-fold by rotary evaporation, giving a heavy crop of crystals. The product was filtered, washed with cold water and cold acetone, and dried under vacuum. This material, which assayed 97% 6–APA (hydroxamate assay) without recrystallization, represented 74% of the conversion mixture content, and an overall yield of 50%. The mother liquor contained an additional 10% of the theoretical yield.

Example 8

Like experiments demonstrate that solid 6–APA can be prepared in substantially the same manner when the amidase is produced (1) by species of the following genera of the class Schizomycetes, acting on penicillin G: Bacillus, Aerobacter, Micrococcus, Mycobacterium, Bordetella, Pseudomonas, and Nocardia; (2) by species of the genus Streptomyces, acting on penicillin V; (3) by species of the genus Mucor of the class Phycomycetes, acting on penicillin V; (4) by species of the genera Gibberella and Hypomyces of the class Ascomycetes, acting on penicillin V; and (5) by species of the following genera of the class *Fungi imperfecti,* acting on penicillin V: Humicola, Cephalosporium, Stemphylium, Cylindrocarpon, and Aspergillus.

Example 9

A packed wet cell mass, weighing 120 grams, from a broth culture of *Alcaligenes faecalis* was suspended in 4 liters of 0.01 M potassium phosphate buffer, pH 7.8, containing 40 grams of potassium penicillin G. The suspension was shaken on a rotary shaker for 18 hours at 28°. After centrifugation, the supernatant solution comprised 4.05 liters at pH 6.0 and contained 19.8 grams of 6–APA. This solution was acidified to pH 2.4 by adding 6 N HCl, and it was then extracted with an equal volume of n-amylacetate. The aqueous portion, which contained 15.15 grams of 6–APA, was adjusted to pH 3.8 with 10 N NaOH and divided into two equal portions. One was adjusted to pH 7.2 and concentrated to 50 ml. The other portion was held at pH 3.8 and concentrated to 50 ml. After 20 hours at room temperature, both systems were filtered. The pH 7.2 precipitate contained 0.15 gram of 6–APA. In contrast, the pH 3.8 iso-electric precipitate contained 3.2 grams of 6–APA. The pH 7.2 filtrate was adjusted to pH 3.8 and filtered after 2 hours. The isoelectric precipitate prepared in this manner contained only 0.07 gram of 6–APA, while the mother liquor contained 1.7 grams of 6–APA, as well as 6–APA polymer, 8-hydroxypenillic acid, and penicic acid.

We claim:
1. The process of converting penicillin in an aqueous medium to 6-aminopenicillanic acid and recovering the latter from said medium, which process comprises:
   (A) preparing an aqueous slightly alkaline mixture including penicillin and resuspended cells of a micro-organism that produces amidase capable of cleaving the penicillin at $C_6$, said micro-organism being selected from the group consisting of *Alcaligenes faecalis, E. coli* and *Fusarium equiseti*;
   (B) thereafter, incubating said mixture for a period sufficient to cause formation of 6-aminopenicillanic acid; and
   (C) then processing said incubated mixture by (1) removing said cells therefrom, (2) adjusting the pH thereof to the range 1.5–3.0, (3) extracting therefrom a compound resulting from the hydrolysis of the acyl side chain of said penicillin, (4) adjusting the pH thereof to the range 3.0–5.0, and (5) concentrating from 10 to 100 fold to crystallize 6-aminopenicillanic acid therefrom.
2. The process of converting penicillin in an aqueous medium to 6-aminopenicillanic acid and recovering the latter from said medium, which process comprises:
   (A) preparing an aqueous mixture including penicillin and resuspended cells of a micro-organism that produces amidase capable of cleaving the penicillin at $C_6$, said micro-organism being selected from the group consisting of *Alcaligenes faecalis, E. coli* and *Fusarium equiseti*;
   (B) adjusting said mixture to about pH 7.7 by addition of a buffer;
   (C) thereafter, incubating the buffered aqueous mixture for about 16–18 hours at a temperature of about 28° to cause formation of 6-aminopenicillanic acid; and
   (D) then processing said incubated mixture by (1) removing said cells therefrom, (2) adjusting the pH thereof to the range 1.5–3.0, (3) extracting with an organic solvent to remove material therefrom of the group consisting of phenyl acetic acid, phenoxy acetic acid, penicillin, and penicilloic acid, (4) adjusting the pH thereof to the range 3.6–4.1, and (5) concentrating about 50 fold to crystallize 6-aminopenicillanic acid therefrom.

3. The process of converting penicillin to 6-aminopenicillanic acid as claimed in claim 2 wherein the penicillin is potassium penicillin G and the micro-organism is *Alcaligenes faecalis*.

4. The process of converting penicillin to 6-aminopenicillanic acid as claimed in claim 2 wherein the penicillin is potassium penicillin G and the micro-organism is *E. coli*.

5. The process of converting penicillin to 6-aminopenicillanic acid as claimed in claim 2 wherein the penicillin is potassium penicillin V and the micro-organism is *Fusarium aquiseti*.

References Cited by the Examiner

UNITED STATES PATENTS

| | | | |
|---|---|---|---|
| 2,941,995 | 6/1960 | Doyle et al. | 260—239.1 |
| 3,014,846 | 12/1961 | Robinson et al. | 195—36.01 |
| 3,116,218 | 12/1963 | Kaufmann et al. | 195—36 |

A. LOUIS MONACELL, *Primary Examiner.*

ABRAHAM H. WINKELSTEIN, D. M. STEPHENS, *Assistant Examiners.*